Jan. 24, 1961
D. J. BUCKLEY ET AL
2,969,341
VULCANIZABLE BUTYL RUBBER – GR-S BLENDS
AND PROCESS OF MAKING SAME
Filed Dec. 14, 1954
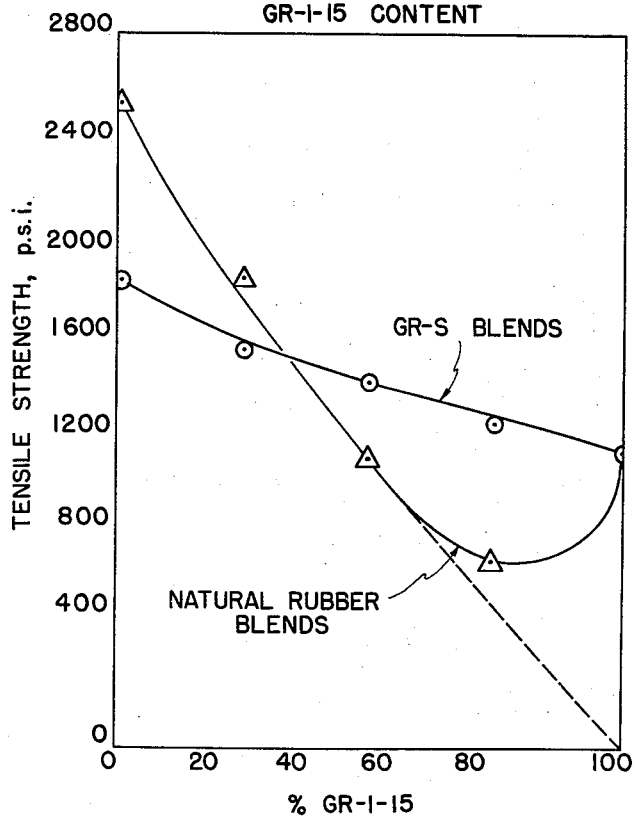
BLENDS GR-I WITH GR-S AND NATURAL RUBBER
TENSILE STRENGTH
VS
GR-I-15 CONTENT
Donald J. Buckley
Samuel B. Robison    Inventors
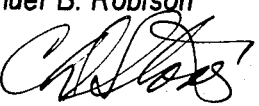  Attorney

United States Patent Office 2,969,341
Patented Jan. 24, 1961

2,969,341
VULCANIZABLE BUTYL RUBBER—GR–S BLENDS AND PROCESS OF MAKING SAME

Donald J. Buckley, Plainfield, and Samuel B. Robison, Roselle, N.J., assignors to Esso Research and Engineering Company, a corporation of Delaware Filed Dec. 14, 1954, Ser. No. 475,255
17 Claims. (Cl. 260—45.5)

This invention relates to a method for curing mixtures of butyl rubber with more unsaturated synthetic rubbers and relates more particularly to the curing of mixtures of butyl rubber and rubbery copolymers of butadiene and styrene.

It has heretofore been considered impossible to obtain satisfactory vulcanizates from blends of butyl rubber and more highly unsaturated polymers such as GR–S. In such blends, using conventional sulfur cures, the butyl rubber functions as an inert filler, the tensile properties of the vulcanizate being lowered in proportion to the butyl rubber content. Also, severe blistering and/or porosity of the vulcanizate are frequently encountered when attempting to cure such blends with conventional sulfur curatives, particularly when the blend contains a substantial amount of butyl rubber, e.g. 60% or more.

It has now been found that these difficulties can be overcome and high quality vulcanizates of butyl rubber and rubbery copolymers of butadiene and styrene can be obtained by the use of curing agents which do not depend upon sulfur for their effect.

Butyl rubber is the copolymer of isobutylene with a multiolefin prepared at low temperature by a Friedel-Crafts catalyst. The major component of the copolymer is preferably isobutylene. The minor component is a multiolefin having from 4 to 12 or 14 carbon atoms per molecule. The preferred multiolefins are butadiene, isoprene, dimethyl butadiene, dimethallyl, myrcene, allo-ocymene and the like. Of these materials, isoprene is at the present time regarded as the best multiolefin. The isobutylene and the multiolefin are mixed in the ratio of a major proportion of isobutylene and a minor proportion of the isoprene, the preferred range with isoprene being from 1 to 10 parts of isoprene with 99 to 90 parts of isobutylene. High purity is desirable in both materials and it is preferable to use an isobutylene of at least 99% purity, although satisfactory copoylmers can be made from materials of considerably lower purity.

The mixture of monomers is cooled to a temperature within the range between —40° C. and —164° C., the preferred range being between —78° C. and —103° C. The material may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory and conveniently usable, and in some instances even liquid methane is usable, although usually the temperature of boiling liquid methane is undesirably low.

The cold mixture is then polymerized by the addition thereto of a Friedel-Crafts catalyst, preferably in liquid or dissolved form. It is ordinarily found that an amount of catalyst ranging from .15% to about 1.0% of the weight of mixed olefins is required to polymerize them into the high molecular weight polymer. It may be further noted that a partial copolymerization only may be obtained by limiting the amount of catalyst added.

In the polymerization reaction the liquid catalyst may be sprayed onto the surface of the rapidly-stirred, cold olefinic material, or a small high-pressure stream of catalyst may be directed into the body of the rapidly-stirred cold olefinic material. In either process, powerful and efficient stirring and agitating is required to disperse the catalyst rapidly into the cold olefinic material.

The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, an ether, an aldehyde or an organic acid to inactivate the catalyst if desired. The warm water primarily serves the purpose of flashing off the excess refrigerant, the unpolymerized olefins and catalyst solvent. The polymer is then recovered from the water suspension in any convenient manner, such as straining or filtering or otherwise, as may be convenient. The polymer is then dried either as a blanket passing through a tunnel drier, or on the mill, as desired. The resulting product is a plastic, elastic material.

As so produced, the polymer shows a molecular weight, or Staudinger number, within the range between approximately 35,000 and 90,000, the minimum useful molecular weight being about 20,000, the preferred range being between 45,000 and 60,00. The material also shows a Wijs iodine number between about 1 and 20 and a maximum of about 50, although the preferred iodine number is usually about 7-15. The preparation of this copolymer is described in U.S. 2,356,128 to which reference may be had for further details.

The rubbery copolymers of butadiene and styrene (GR–S) may be obtained by polymerization in a homogeneous system or in aqueous emulsion or by any other method of forming polymers. If the homogeneous method of polymerization is used, it is convenient to initiate the polymerization by heating the monomer mixture to a temperature between room temperature and about 100° C., preferably in the presence of a substance capable of accelerating the reaction such as a peroxide and in the presence of a solvent for the reagents, if desired. When polymerization is complete, which usually requires several days by this method, the polymer is separated from unreacted monomer and/or solvent if these are present and the massive material is then processed in the usual manner.

The most efficient and preferred method of polymerizing the monomer mixtures in the preparation of GR–S, however, is to carry out the reaction in an aqueous emulsion. In this process the mixture of monomers is emulsified with water by means of a suitable emulsifying agent, a polymerzation initiator or accelerator is preferably added together perhaps with other substances which activate the accelerator or which otherwise influence the polymerization in a desired manner, and the emulsion is allowed to polymerize by continuously agitating the same at a temperature about 5–60° C. for a time sufficient to complete the reaction, usually from about 5 to 150 hours. The copolymer is obtained in the form of an aqueous dispersion resembling natural rubber latex to which an age resistor or antioxidant may be added, if desired, and which may then be utilized as such or coagulated by the same methods used to coagulate natural rubber latex, for example, by addition of acid, alcohol or salts or by a combination of these methods. The polymerization products are washed and dried to produce a crude rubber-like material which may then be processed in substantially the same manner as natural rubber.

A large number of materials may be used in the above process to bring about emulsification of the monomer mixture with water. Ordinary soaps such as the sodium or potassium salts of saturated or unsaturated fatty acids, for example, sodium myristate, sodium palmitate and sodium oleate or synthetic soap-like materials, such as aliphatic sulfates or sulfonates, aromatic sulfonates, and salts of high molecular weight aliphatic bases; for example, sodium lauryl sulfate, sodium naphthalene sulfonate, the hydrochloride of diethyl aminoethyloleyl amide and cetyltrimethyl ammonium methyl sulfate, or other emulsifying agents are operable in this invention. A very effective emulsifying solution is one which contains a saturated fatty acid such as myristic acid which has been from about 70 to 95% neutralized with alkali.

An equally large number of substances is available for selection of the polymerization accelerator or catalyst to be employed in the emulsion polymerization process. Substances soluble in either the aqueous phase or non-aqueous phase of the emulsion may be used. Among the polymerization accelerators are the organic and inorganic peroxides such as hydrogen peroxide, diacyl peroxides and benzoyl peroxide, per-salts such as alkali metal perborates, persulfates and percarbonates, diazo compounds such as diazoamino benzene and dipotassium diazomethane disulfonate and other substances. Substances which activate or catalyze the action of the polymerization accelerator may also be used therewith. Such compounds as sodium pyrophosphate, sodium oxalate, acetanilide, urea, glycine, myristic acid and the like have been found to act as activators for the peroxide type accelerators. In some instances it may be desirable to add other ingredients to improve the properties of the copolymers or to modify the course of the polymerization. By proper selection of the ingredients going into the aqueous emulsion it is possible to speed up the polymerization and to vary the properties of the polymerization products.

According to the present invention the above two types of polymers may be mixed in any proportion and cured together by means of non-sulfur curing aids. In the non-sulfur curative systems to be described the physical properties of the vulcanizates can be improved by the addition of minor quantities of sulfur, usually from 0.5 to 4 parts. These non-sulfur types of cure fall into three classes and are described below.

PARAQUINONE DIOXIME CURE

A combination of paraquinone dioxime and lead oxide is capable of vulcanizing the polymer. The chemical reactions involved in the vulcanization of the polymer by quinone dioxime in the presence of an oxidizing agent appear to consist in the formation of aromatic nitroso groups which in turn react with the unsaturated units in the polymer chain. Paraquinone dioxime concentrations are from 1 to 8 and the lead oxide concentrations from 5 to 20 parts per 100 parts of polymers. The ratio of 2 paraquinone dioxime and 10 lead oxide is the most efficient combination.

BENZOTHIAZYL DISULFIDE CURE

Benzothiazyl disulfide acts as a mild oxidizing agent for paraquinone dioxime by virtue of the cleavage of the disulfide to form two mercaptan molecules. Apparently the conversion of the dioxime to the nitroso group brought about by the loss of a hydrogen atom results in the same type of vulcanization mechanism as for the paraquinone dioxime cure. The reaction in this case, however, is not as rapid as for the paraquinone dioxime lead oxide blend. The following limits apply for this particular cure: Benzothiazyl disulfide 1.0 to 6.0, preferably 4 parts per 100 parts of polymer; paraquinone dioxime 1.0 to 8.0, preferably 2.

PARAQUINONE DIOXIME DIBENZOATE CURE

The action of this quinone is identical with that of paraquinone dioxime when reacted with lead oxide. The following concentrations are suitable: Paraquinone dioxime dibenzoate 1 to 10, preferably 6 parts per 100 parts of polymer; lead oxide 5 to 20, preferably 10.

The advantages of the invention will be better understood from a consideration of the following experimental data which are given for the sake of illustration, but without intention of limiting the invention thereto.

Example I

Three non-sulfur compounds were prepared, one each from butyl rubber, copolymer of butadiene and styrene (GR–S) and natural rubber in accordance with the following recipes:

| Compound | Grams | | |
|---|---|---|---|
| | A | B | C |
| GR–S (a) | 200 | | |
| Smoked Sheet (Hevea) | | 200 | |
| GR–I–15 (b) | | | 300 |
| Zinc Oxide | 10 | 10 | 15 |
| Gastex (c) | 100 | 100 | 150 |
| Dibenzo GMF (d) | 12 | 12 | 18 |
| Red Lead, Pb₃O₄ | 20 | 20 | 30 | a Butadiene-styrene copolymer, regular grade.
b Butyl rubber
c Carbon black.
d Paraquinone dioxime dibenzoate.

These batches were blended to yield compounds with varying polymer ratios. Cured 6 x 6 x .075 inch tensile pads were prepared from these blends and their properties were evaluated. The data are reported in Table I and the attached graph.

TABLE I

| Sample | 1 | 2 | 3 | 4 | 5 | 6 | 7 | 8 | 9 |
|---|---|---|---|---|---|---|---|---|---|
| GR–S (A), g | 100 | 75 | 50 | 25 | | | | | |
| GR–I (C), g | | 25 | 50 | 75 | 100 | 75 | 50 | 25 | |
| Hevea (B), g | | | | | | 25 | 50 | 75 | 100 |

[Cured 30 minutes at 300° F.]

| | | | | | | | | | |
|---|---|---|---|---|---|---|---|---|---|
| 100% Modulus, p.s.i | 325 | 370 | 370 | 350 | 250 | 375 | 480 | 440 | 420 |
| 200% Modulus, p.s.i | 710 | 775 | 750 | 680 | 575 | 560 | 1,050 | 1,250 | 1,300 |
| 300% Modulus, p.s.i | 1,150 | 1,160 | 1,075 | 980 | 950 | 660 | | | 2,360 |
| Tensile strength, p.s.i | 1,825 | 1,560 | 1,430 | 1,275 | 1,175 | 740 | 1,150 | 1,850 | 2,525 |
| Ultimate Elongation, percent | 580 | 535 | 500 | 430 | 420 | 400 | 240 | 265 | 310 |

The above data and the graph show that the butyl rubber is not covulcanizing efficiently with natural rubber in the Hevea-butyl rubber blends. The possible extrapolation of the Hevea-butyl blends tensile curve to zero tensile for the 100% GR–I–15 concentration indicates that below ca. 60% GR–I–15 the butyl rubber is not contributing to the tensile strength of the vulcanizate.

The tensile of the 75% GR–I–15 + 25% Hevea recipe is well below the tensile of either component alone in this recipe. This illustrates the fact that the butyl is contributing very little (if anything) to the vulcanizate properties.

In case of Butyl–GR–S blends the tensile strength progresses evenly from level of 100% GR-S to 100 GR-I. Each contributes in proportion to its tensile strength and concentration.

Example II

Tensile pads, 6 x 6 x .075 inches, were prepared from polymer blends containing equal portions of GR-S and butyl polymer of varying unsaturation and from polyisobutylene. The properties of these vulcanizates were evaluated and the data are reported in Table II.

TABLE II

| Sample | 11 | 12 | 13 | 14 |
|---|---|---|---|---|
| Butyl polymer | Polyisobutylene | GR-I-R-2 [a] | GR-I-15 [b] | GR-I-25 [c] |
| grams | 50 | 50 | 50 | 50 |
| GR-S | 50 | 50 | 50 | 50 |

[Compounded with 5 g. Zinc Oxide, 50 g. Gastex, 2 g. GMF,[d] and 10 g. Pb₃O₄. Cured 30 minutes @300° F.]

| | | | | |
|---|---|---|---|---|
| Modulus @100%, p.s.i | [e] 255 | 310 | 330 | 300 |
| Modulus @200%, p.s.i | | 700 | 805 | 685 |
| Modulus @300%, p.s.i | | 960 | 1,160 | 1,110 |
| Tensile Strength, p.s.i | 540 | 1,030 | 1,250 | 1,435 |
| Elongation-at-break, percent | 200 | 340 | 350 | 385 |

[a] Butyl rubber (Iodine No. 6-8).
[b] Butyl rubber (Iodine No. 11-13).
[c] Butyl rubber (Iodine No. 13-15).
[d] Paraquinone dioxime.
[e] Blistered.

The above data show that improved results are obtained with increasing unsaturation of the butyl rubber.

The polyisobutylene—GRS blend shows that polyisobutylene (which contains no unsaturation) is not co-cured with the GR-S.

Example III

Tensile pads of 50-50 blends of GR-S and butyl rubber containing various fillers as reinforcing agents were prepared and evaluated. The data are shown in Table III.

TABLE III

| Sample | 15 | 16 | 17 | 18 |
|---|---|---|---|---|
| Filler (50 pts.) | Cabot #9 [a] | Philblack O [b] | Gastex [c] | Witcarb R [d] |

[Cured 30 min. @300° F. with 5 pts. zinc oxide, 6 pts. dibenzo GMF, and 10 pts. Pb₃O₄]

| | | | | |
|---|---|---|---|---|
| Modulus @ 100%, p.s.i | 520 | 560 | 370 | 175 |
| Modulus @ 200%, p.s.i | 1,045 | 1,185 | 750 | 225 |
| Tensile Strength, p.s.i | 1,610 | 1,510 | 1,430 | 955 |
| Elongation-at-break, percent | 300 | 260 | 500 | 645 |

[a] Carbon black.
[b] Carbon black.
[c] Carbon black.
[d] Clay.

The above data show that the moduli and extensibility of the blends can be varied over a considerable range by proper choice of filler.

Example IV

Test specimens were prepared from blends of equal amounts of GR-S and butyl rubber and from GR-S alone. Each blended sample was cured with paraquinone dioxime in the presence of various organic and inorganic activators while the 100% GR-S sample was cured with sulfur alone. The properties of the cured samples were evaluated and are reported in Table IV.

TABLE IV

| Sample | 19 | 20 | 21 | 22 | 23 | 24 | 25 | 26 | 27 |
|---|---|---|---|---|---|---|---|---|---|
| GR-S (reg.) | 50 | 50 | 50 | 50 | 100 | 50 | 50 | 50 | 50 |
| GR-I-15 | 50 | 50 | 50 | 50 | | 50 | 50 | 50 | 50 |
| Zinc Oxide | 5 | 5 | 5 | 5 | 5 | 5 | 5 | 5 | 5 |
| Gastex | 50 | 50 | 50 | 50 | 50 | 50 | 50 | 50 | 50 |
| Sulfur | | | | 1.5 | 3 | | | | 2.5 |
| GMF | 2 | 2 | 2 | 2 | | | | | |
| Dibenzo GMF | | | | | | 6 | 4 | 2 | |
| Pb₃O₄ | 10 | 10 | | 10 | | | | | |
| Altax [b] | | | 4 | | 1 | 6 | 6 | 6 | 1 |
| Tuads [c] | | | | | 0.1 | | | | 1 |
| Faxam, 40 [d] | | | | | 5 | | | | |
| Cure @300°F., min | 20—30—40 | 30 | 30 | 30 | 30 | 30 | 30 | 30 | 30 |
| 100% Modulus, p.s.i | 360—330—370 | 605 | 375 | 245 | | 470 | 485 | 445 | 305 |
| 200% Modulus, p.s.i | 780—805—795 | 1,280 | 800 | 530 | 1,300 | 1,010 | 895 | 645 | |
| Tensile Strength, p.s.i | 1,230—1,250—1,280 | 1,795 | 1,200 | 955 | 2,240 | 1,235 | 1,100 | 825 | 1,255 |
| Ultimate Elongation, Percent | 350—350—335 | 290 | 390 | 350 | 290 | 300 | 300 | 300 | 90 |
| Ozone Cracking Test—0.012% ozone: Minutes [a] | 9 | 10 | 10 | | 3 | | | | |

[a] Minutes till visible signs of cracking of bent specimen.
[b] Altax=benzothiazyl disulfide.
[c] Tuads=tetramethyl thiuram disulfide.
[d] Mineral oil softener.

A comparison of recipes 19 and 20 shows that the presence of sulfur improves the cure. The data also show that the tensile strengths of the cured blends decrease as the concentration of the paraquinone dioxime dibenzoate is lowered from 6 parts. Furthermore, the ozone cracking test shows that it takes approximately three times as long for visible signs of failure to develop in the nonsulfur-cured blends as in the sulfur-cured control.

The above examples clearly demonstrate that butyl rubber can be covulcanized with GR-S rubber but not with natural rubber using nonsulfur type cures.

The nature of the present invention having been thus fully set forth and specific examples of the same given, what is claimed as new and useful and desired to be secured by Letters Patent is:

1. A sulfur-free composition of matter comprising a vulcanizable blend of about 25 to 75 weight percent of butyl rubber copolymer of a major proportion of isobutylene and a minor proportion of a $C_4$ to $C_{14}$ di-olefin, about 25 to 75 weight percent of a rubbery copolymer of butadiene and styrene, about 1 to 10 weight percent of a curing agent selected from the group consisting of paraquinone dioxime and paraquinone dioxime dibenzoate and about 1 to 20 weight percent of an oxidizing agent selected from the group consisting of lead oxide and benzothiazyl disulfide; said composition being free of elemental sulfur and being covulcanizable upon heating.

2. A composition according to claim 1 in which the curing agent is paraquinone dioxime.

3. A composition according to claim 1 in which the curing agent is paraquinone dioxime dibenzoate.

4. A composition according to claim 1 in which the oxidizing agent is lead tetroxide.

5. A composition according to claim 1 in which the oxidizing agent is benzothiazyl disulfide.

6. A composition according to claim 1 in which the diolefin is isoprene.

7. A process for preparing a sulfur-free covulcanized blend of about 25 to 75 parts of a butyl rubbery copolymer of a major proportion of isobutylene and a minor proportion of a $C_4$ to $C_{14}$ diolefin and about 25 to 75 parts of a rubbery copolymer of butadiene and styrene which comprises covulcanizing said blend in the absence of elemental sulfur with a sulfur-free composition comprising about 1 to 10 weight percent, a curing agent selected from the group consisting of paraquinone dioxime and paraquinone dioxime dibenzoate and about 1 to 20 weight percent of an oxidizing agent selected from the group consisting of lead oxide and benzothiazyl disulfide; said composition being free of elemental sulfur.

8. A process according to claim 7 in which the curing agent is paraquinone dioxime.

9. A process according to claim 7 in which the curing agent is paraquinone dioxime dibenzoate.

10. A process according to claim 7 in which the oxidizing agent is lead tetroxide.

11. A process according to claim 7 in which the oxidizing agent is benzothiazyl disulfide.

12. A process according to claim 7 in which the diolefin is isoprene.

13. A sulfur-free composition comprising a covulcanizable blend of about 100 parts by weight of a mixture of about 25 to 75 parts by weight of butyl rubber of the isobutylene-isoprene type with about 25 to 75 parts by weight of a rubbery copolymer of butadiene and styrene, about 1 to 10 parts by weight of a curing agent selected from the group consisting of paraquinone dioxime and paraquinone dioxime dibenzoate, and about 1 to 20 parts by weight of an oxidizing agent selected from the group consisting of about 5 to 20 parts by weight of lead oxide and about 1 to 6 parts by weight of benzothiazyl disulfide; said composition being free of elemental sulfur.

14. Composition according to claim 13 in which the curing agent is paraquinone dioxime.

15. Composition according to claim 13 in which the curing agent is paraquinone dioxime dibenzoate; the oxidizing agent being lead tetroxide.

16. Composition according to claim 13 which has been cured in the absence of elemental sulfur until a vulcanizate having a tensile strength of above about 800 p.s.i. is obtained.

17. A process for preparing a sulfur-free covulcanized rubber blend of about 25 to 75 weight percent of a butyl copolymer of isobutylene and a $C_4$ to $C_{14}$ diolefin with about 25 to 75 weight percent of a rubbery copolymer of butadiene and styrene which comprises curing said blend in the absence of elemental sulfur with a sulfur-free composition comprising about 1 to 10 parts by weight of a curing agent selected from the group consisting of paraquinone dioxime and paraquinone dioxime dibenzoate, and an oxidizing agent selected from the group consisting of about 5 to 20 parts by weight of lead oxide and about 1 to 6 parts by weight of benzothiazyl disulfide; said composition being free of elemental sulfur.

References Cited in the file of this patent

UNITED STATES PATENTS

| | | |
|---|---|---|
| 2,317,463 | Jones | Apr. 27, 1943 |
| 2,393,321 | Haworth | Jan. 22, 1946 |
| 2,415,627 | Cooper | Feb. 11, 1947 |
| 2,548,505 | Turner et al. | Apr. 10, 1951 |
| 2,557,641 | Dudley | June 19, 1951 |
| 2,557,642 | Dudley | June 19, 1951 |